US009496087B2

(12) United States Patent
Satou

(10) Patent No.: US 9,496,087 B2
(45) Date of Patent: Nov. 15, 2016

(54) MULTILAYER CERAMIC CAPACITOR

(71) Applicant: KYOCERA Corporation, Kyoto-shi, Kyoto (JP)

(72) Inventor: Hisashi Satou, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 92 days.

(21) Appl. No.: 14/410,561

(22) PCT Filed: Jun. 21, 2013

(86) PCT No.: PCT/JP2013/067094
§ 371 (c)(1),
(2) Date: Dec. 22, 2014

(87) PCT Pub. No.: WO2013/191277
PCT Pub. Date: Dec. 27, 2013

(65) Prior Publication Data
US 2015/0325373 A1    Nov. 12, 2015

(30) Foreign Application Priority Data

Jun. 21, 2012    (JP) .................................. 2012-139875

(51) Int. Cl.
*H01G 4/30* (2006.01)
*H01G 4/236* (2006.01)
(Continued)

(52) U.S. Cl.
CPC .............. *H01G 4/236* (2013.01); *H01G 4/005* (2013.01); *H01G 4/008* (2013.01); *H01G 4/01* (2013.01);
(Continued)

(58) Field of Classification Search
CPC ........ H01G 4/30; H01G 4/1227; H01G 4/12; H01G 4/012; H01G 4/0085; H01G 4/008; H01G 4/005; H01G 4/1218; H01G 4/1209; H01G 4/01; H01G 4/10
See application file for complete search history.

(56) References Cited

U.S. PATENT DOCUMENTS 5,021,921 A    6/1991  Sano et al.
5,889,445 A *  3/1999  Ritter ....................... H03H 1/02
                                                      333/172
(Continued)

FOREIGN PATENT DOCUMENTS

CN    101651044 A    2/2010
JP      3-41710 A    2/1991
(Continued)

OTHER PUBLICATIONS

International Search report dated Jul. 16, 2013 issued for corresponding International patent application No. PCT/JP2013/067094.
(Continued)

*Primary Examiner* — Dion R Ferguson
(74) *Attorney, Agent, or Firm* — Procopio, Cory, Hargreaves and Savitch, LLP

(57) ABSTRACT

There is provided a multilayer ceramic capacitor in which an increase in conductor resistance at an end of an internal electrode layer is suppressed, and in which a gap between the internal electrode layer and a dielectric layer is reduced. A multilayer ceramic capacitor includes a stacked body including dielectric layers and internal electrode layers alternately laminated; and an external electrode disposed on an end surface of the stacked body and connected to the internal electrode layers, the internal electrode layers each including a connection electrode portion connected to the external electrode, and an internal electrode portion which is connected to the connection electrode portion and extends toward an inner side of the stacked body, a ratio of a material having a melting point higher than that of a conductive material being higher in the connection electrode portion than in the internal electrode portion.

7 Claims, 8 Drawing Sheets

(51) Int. Cl.
*H01G 4/12* (2006.01)
*H01G 4/012* (2006.01)
*H01G 4/248* (2006.01)
*H01G 4/01* (2006.01)
*H01G 4/008* (2006.01)
*H01G 4/232* (2006.01)
*H01G 4/005* (2006.01)

(52) U.S. Cl.
CPC ............... *H01G 4/012* (2013.01); *H01G 4/12* (2013.01); *H01G 4/232* (2013.01); *H01G 4/248* (2013.01); *H01G 4/30* (2013.01)

(56) References Cited

U.S. PATENT DOCUMENTS

| | | | | |
|---|---|---|---|---|
| 2005/0219795 | A1* | 10/2005 | Murosawa | H01G 4/30 361/321.2 |
| 2005/0254197 | A1* | 11/2005 | Murosawa | H01G 4/30 361/321.2 |
| 2010/0038120 | A1 | 2/2010 | Kojima et al. | |
| 2013/0258551 | A1* | 10/2013 | Kim | H01B 1/16 361/321.3 |
| 2013/0286538 | A1* | 10/2013 | Kim | H01G 4/30 361/303 |

FOREIGN PATENT DOCUMENTS

| | | |
|---|---|---|
| JP | 11-11155 A | 4/1999 |
| JP | 2000-138129 A | 5/2000 |
| JP | 2007-335726 A | 12/2007 |
| JP | 2012-253245 A | 12/2012 |

OTHER PUBLICATIONS

Office Action dated Aug. 8, 2016 issued by the Chinese Patent Office in corresponding Chinese Patent Application No. 201380029618.4.

\* cited by examiner (a)

(b)

(c)

(a)

(b)

(a)

(b)

(a)

(b)

(a)

(b)

(a)

(b)

(a)

(b)

MULTILAYER CERAMIC CAPACITOR

TECHNICAL FIELD

The present invention relates to a multilayer ceramic capacitor comprising a stacked body including dielectric layers and internal electrode layers alternately laminated, and an external electrode disposed on an end surface of the stacked body and connected to the internal electrode layers.

BACKGROUND ART

In general, the multilayer ceramic capacitor includes a plurality of laminated dielectric layers, a plurality of internal electrode layers that are disposed between the dielectric layers, and external electrodes that are disposed on both end surfaces of a stacked body composed of the dielectric layers and the internal electrode layers and are connected to the internal electrode layers. After preparing the stacked body formed by co-firing the dielectric layers and the internal electrode layers, the external electrode is formed on both end surfaces of the stacked body to prepare the multilayer ceramic capacitor.

The stacked body is prepared as follows. A plurality of sheets, which are obtained by forming a conductive paste layer that becomes an internal electrode layer on a green sheet that becomes a dielectric layer, are laminated to prepare a green stacked body, and then the green stacked body is fired to prepare the stacked body. During the firing, a ceramic powder that is a dielectric, and a metal powder of silver (Ag) or the like that is a conductive material of the internal electrode layer have sintering shrinkage behaviors different from each other. Therefore, in the stacked body obtained after the firing, a gap is frequently formed between the dielectric layers and the internal electrode layers. When the gap exists from an end surface of the stacked body to the inside of the stacked body, there is a problem that a plating solution or moisture may intrude into the inside of the stacked body through the gap during a subsequent process of forming the external electrode, particularly, during a subsequent plating process, and thus an insulating property deteriorates and reliability is lowered. In addition, there is a concern that moisture remaining in the gap may expand due to heating during mounting of the multilayer ceramic capacitor on a circuit substrate and the like, and thus the multilayer ceramic capacitor may be broken.

As a structure configured to cope with the above-described problem, such a structure is known that a semiconductor portion of the dielectric at the periphery of the ends of the internal electrodes is disposed between the internal electrode layers and the external electrode, and the internal electrode layers and the external electrode are electrically connected, but are structurally separated by a semiconductor layer (for example, refer to Patent Literature 1).

CITATION LIST

Patent Literature

Patent Literature 1: Japanese Unexamined Patent Publication JP-A 3-41710 (1991)

SUMMARY OF INVENTION

Technical Problem

However, in the structure of the multilayer ceramic capacitor of the related art, conductor resistance of a connection portion between each of the internal electrode layers and the external electrode increases, and thus capacitor performance (tan δ or high-frequency characteristics) tends to decrease. In addition, making the dielectric layer into a semiconductor depends on a firing temperature or a firing atmosphere during a manufacturing process, and thus management of the process is difficult. Therefore, there is a problem that a range of the semiconductor portion of the dielectric increases or becomes non-uniform, and thus dielectric characteristics of the entirety of the capacitor deteriorate or become non-uniform.

An object of the invention is to provide a multilayer ceramic capacitor in which an increase in conductor resistance at an end of an internal electrode layer is suppressed, and in which a gap between the internal electrode layer and a dielectric layer is reduced.

Solution to Problem

According to an aspect of the invention, there is provided a multilayer ceramic capacitor comprising: a stacked body including dielectric layers and internal electrode layers alternately laminated; and an external electrode disposed on an end surface of the stacked body and connected to the internal electrode layers, the internal electrode layers each including a connection electrode portion connected to the external electrode, and an internal electrode portion which is connected to the connection electrode portion and extends toward an inner side of the stacked body, the connection electrode portion containing a first conductive material and a material having a melting point higher than that of the first conductive material, the internal electrode portion containing a second conductive material, or the second conductive material and a material having a melting point higher than that of the second conductive material, a ratio of the material having a melting point higher than that of the first conductive material in the connection electrode portion is higher than a ratio of the material having a melting point higher than that of the second conductive material in the internal electrode portion.

Advantageous Effects of Invention

According to the multilayer ceramic capacitor in accordance with the aspect of the invention, the internal electrode layer has the connection electrode portion in which a ratio of a material having a melting point higher than that of a conductive material is higher than in the internal electrode portion, and thus a sintering behavior of the connection electrode portion during the firing becomes similar to that of a dielectric at the periphery of the connection electrode portion. As a result, a gap between the internal electrode layer and the dielectric layer is not present at an end of the internal electrode layer, and the connection electrode portion is configured to contain a conductive material, and thus conductor resistance becomes relatively small.

BRIEF DESCRIPTION OF DRAWINGS

FIG. 6 illustrates a process of manufacturing a multilayer ceramic capacitor according to an embodiment of the invention, wherein FIG. 6(a) is a partially enlarged plan view of a ceramic green sheet, and FIG. 6(b) is a cross-sectional view of FIG. 6(a);

FIG. 7 illustrates a process of manufacturing a multilayer ceramic capacitor according to an embodiment of the invention, wherein FIG. 7(a) is a partially enlarged plan view of a ceramic green sheet, and FIG. 7(b) is a cross-sectional view of FIG. 7(a);

DESCRIPTION OF EMBODIMENTS

Hereinafter, an embodiment of the invention will be described with reference to the attached drawings. FIG. 1(a) is a perspective view illustrating a multilayer ceramic capacitor 1 according to an embodiment of the invention, FIG. 1(b) is a cross-sectional view taken along the line A-A of the multilayer ceramic capacitor 1 shown in FIG. 1(a), and FIG. 1(c) is a cross-sectional view taken along the line B-B of the multilayer ceramic capacitor 1 shown in FIG. 1(a). In the multilayer ceramic capacitor 1, an arbitrary direction may be regarded as an upward direction or a downward direction. However, an orthogonal coordinate system xyz is defined for convenience, and a positive side in a z direction is set as an upper side. In this state, a term such as an upper surface or a lower surface is used.

Figure 1:
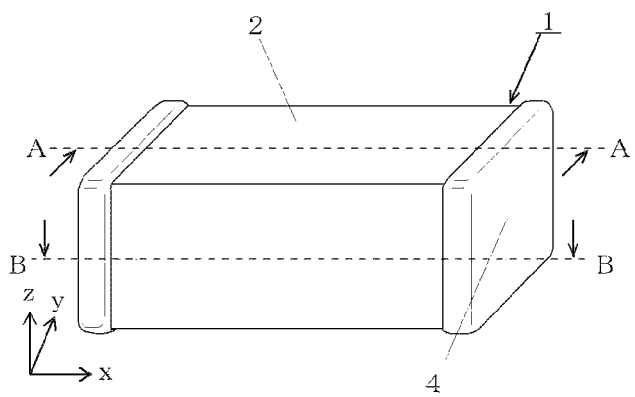
FIG. 1(a) is a perspective view illustrating a multilayer ceramic capacitor according to an embodiment of the invention.
FIG. 1(b) is a cross-sectional view taken along the line A-A of the multilayer ceramic capacitor shown in FIG. 1(a)
FIG. 1(c) is a cross-sectional view taken along the line B-B of the multilayer ceramic capacitor shown in FIG. 1(a)
Figure 1:
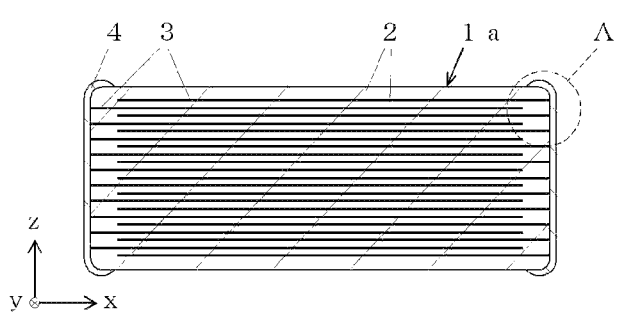
Figure 1:
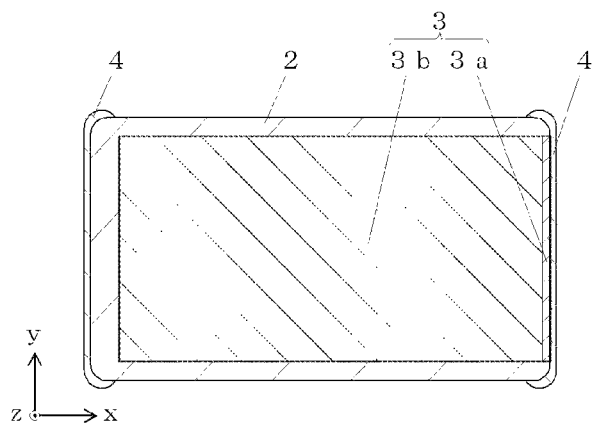
Figure 2:
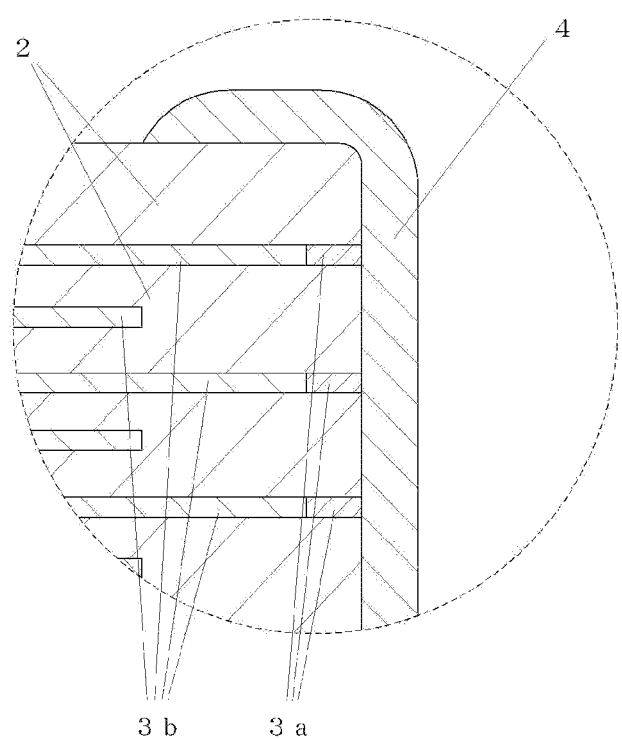
FIG. 2 is an enlarged cross-sectional view illustrating an A portion in FIG. 1(b)

As shown in FIG. 1 and FIG. 2, as a basic configuration, the multilayer ceramic capacitor 1 according to the embodiment of the invention includes a stacked body 1a that is a capacitor main body, and an external electrode 4. The stacked body 1a includes a plurality of laminated dielectric layers 2 and a plurality of internal electrode layers 3, each of which is disposed between the dielectric layers 2. The stacked body 1a of the multilayer ceramic capacitor 1 is formed in an approximately rectangular parallelepiped shape having a first main surface (upper surface) and a second main surface (lower surface) which face each other, a first side surface and a second side surface which face each other, and a first end surface and a second end surface which face each other. In addition, with regard to dimensions of the stacked body 1a, a length of a long side of the stacked body 1a is set to, for example, 0.4 to 3.2 mm, and a length of a short side of the stacked body 1a is set to, for example, 0.2 to 1.6 mm.

The dielectric layers 2 have a rectangular shape in a plan view thereof, and the thickness of one layer is, for example, 1 to 2 μm. In the stacked body 1a, for example, 20 to 2000 layers of the dielectric layers 2 are laminated. Examples of a material of the dielectric layers 2 include materials that contain dielectric ceramics such as $BaTiO_3$, $CaTiO_3$, $SrTiO_3$, or $CaZrO_3$ as a main component. In addition, as an accessory component, for example, a Mn compound, an Fe compound, a Cr compound, a Co compound, a Ni compound, and the like may be added to the dielectric layers 2.

Each of the internal electrode layers 3 is disposed so that one end thereof is exposed to the first end surface or the second end surface of the stacked body 1a. The internal electrode layer 3 that is exposed to the first end surface and the internal electrode layer 3 that is exposed to the second end surface are alternately disposed so that parts thereof face each other through each of the dielectric layers 2. According to this, the multilayer ceramic capacitor 1 is configured to obtain electrostatic capacitance.

Each of the internal electrode layers 3 is disposed between the dielectric layers 2 of the stacked body 1a. The internal electrode layer 3 includes a connection electrode portion 3a that is connected to the external electrode 4, and an internal electrode portion 3b that is connected to the connection electrode portion 3a and extends to an inner side of the stacked body 1a. In addition, the connection electrode portion 3a contains a first conductive material and a material having a melting point higher than that of the first conductive material. The internal electrode portion 3b contains a second conductive material, or the second conductive material and a material having a melting point higher than that of the second conductive material. In addition, a ratio of the material having a melting point higher than the conductive material is higher in the connection electrode portion 3a than in the internal electrode portion 3b. The internal electrode portion 3b may be constituted by only the second conductive material. In a process of manufacturing the stacked body 1a, it is preferable that the internal electrode portion 3b also contains the second conductive material and the material having a melting point higher than that of the second conductive material so as to make a gap formed between the internal electrode portion 3b and the dielectric layer 2 as small as possible.

Examples of the conductive material of the internal electrode layer 3 include metal materials such as Ni, Cu, Ag, Pd, or Au, and alloy materials containing one or more of these metal materials, such as an Ag—Pd alloy. It is preferable that all of the internal electrode layers 3 are formed of the same metal material or the same alloy material. That is, the first conductive material and the second conductive material may be different from each other, or may be the same as each other.

The material contained in the internal electrode layer 3 and having a melting point higher than that of the conductive material, is contained to make a sintering shrinkage behavior of a conductive paste layer 13 which becomes the internal electrode layer 3, similar to a sintering behavior of a ceramic green sheet 12 which becomes the dielectric layer 2, during the firing in the following process of manufacturing the multilayer ceramic capacitor 1. A sintering temperature of the material having a melting point higher than that of the conductive material is higher than that of the conductive material due to the higher melting point and the material is less likely to be sintered during the firing in comparison to the conductive material. Examples of the material include a glass material or a ceramic material such as $BaTiO_3$, $CaTiO_3$, $SrTiO_3$, and $Al_2O_3$, or a metal material having a melting point higher than that of the metal material of the conductive material, such as W, Mo, or Ti. In a case where the material having a higher melting point is constituted by a conductive material such as a metal material, an increase in electrical resistance of the internal electrode layer 3 is suppressed, and thus this case is preferable.

As the material having a higher melting point, the same material as a dielectric material of the dielectric layer 2 is preferable. In a case where the material having a higher melting point is the dielectric material of the dielectric layer 2, in the stacked body 1a, coupling between the internal electrode layer 3 and the dielectric layer 2 becomes strong, and thus a gap therebetween tends to be small. In addition, in the stacked body 1a, the material having a higher melting point is less likely to be diffused to the dielectric layer 2, and even when being diffused, characteristics of the dielectric of the dielectric layer 2 such as a specific dielectric constant and temperature characteristics do not largely vary.

With regard to the internal electrode portion 3b, in a case where the material having a higher melting point is an insulating material, for example, the ratio of the conductive material is preferably 65 to 75% by volume, and the ratio of the material having a melting point higher than that of the conductive material is preferably 25 to 35% by volume. When the ratio of the material having a higher melting point is in this range, a gap with which the internal electrode portion 3b and the dielectric layer 2 are completely separated from each other is not formed in the stacked body 1a. In addition, in the multilayer ceramic capacitor 1, electrical resistance of the internal electrode layer 3 does not increase too much, and thus characteristics of the multilayer ceramic capacitor 1 such as tan δ and high-frequency characteristics do not decrease. In addition, in a case where the internal electrode portion 3b is constituted by only the conductive material, the ratio of the conductive material is 100% by volume.

In the connection electrode portion 3a, in a case where the material having a higher melting point is an insulating material, for example, the ratio of the conductive material is preferably 20 to 55% by volume, and the ratio of the material having a melting point higher than that of the conductive material is preferably 45 to 80% by volume. When the ratio of the material having a higher melting point is in this range, in the stacked body 1a, a gap which is continuous from an outer end of the connection electrode portion 3a which is positioned on an end surface of the laminated body 1a to an inner end of the connection electrode portion 3a which is positioned on an inner side of the laminated body 1a, is not formed between the connection electrode portion 3a and the dielectric layer 2. In addition, since the conductive material is formed continuously from the outer end to the inner end of the connection electrode portion 3a, in the multilayer ceramic capacitor 1, electrical resistance of the internal electrode layer 3 does not increase too much, and thus characteristics of the multilayer ceramic capacitor 1 such as tan δ and high-frequency characteristics do not decrease. That is, in the connection electrode portion 3a, even when the ratio of the material having a higher melting point is large, the conductive material forms a continuous network (three-dimensional network structure), and thus electrical conduction is established between the outer end and the inner end. Accordingly, it is possible to electrically connect the internal electrode portion 3b and the external electrode 4.

For example, the ratio of the conductive material and the material having a higher melting point in the connection electrode portion 3a and the internal electrode portion 3b can be confirmed as follows. First, the multilayer ceramic capacitor 1 is cut out and is polished to expose a cross-section as shown in FIG. 1(b). In addition, a connection portion between the internal electrode portion 3b and the connection electrode portion 3a as shown in an A portion in FIG. 1 is observed and analyzed with a SEM (scanning electron microscope) and an EPMA (electron probe microanalyzer) to obtain the ratio of the conductive material and the material having a higher melting point in the connection electrode portion 3a and the internal electrode portion 3b.

With regard to dimensions of the internal electrode layer 3, a dimension in a long-side direction (x direction in FIG. 1) of the stacked body 1a is, for example, 0.39 to 3.1 mm, and a dimension in a short-side direction (y direction in FIG. 1) of the stacked body 1a is, for example, 0.19 to 1.5 mm. With regard to dimensions of the connection electrode portion 3a in internal electrode layer 3, a length in the long-side direction (x direction in FIG. 1) of the stacked body 1a, that is, a length from the internal electrode portion 3b to the external electrode 4 is 0.05 to 0.5 mm, and a length in the short-side direction (y direction in FIG. 1) of the stacked body 1a is the same as that of the internal electrode layer 3. Although not particularly limited, the thickness of the internal electrode layer 3 is, for example, approximately 0.3 to 2 μm.

Figure 3:
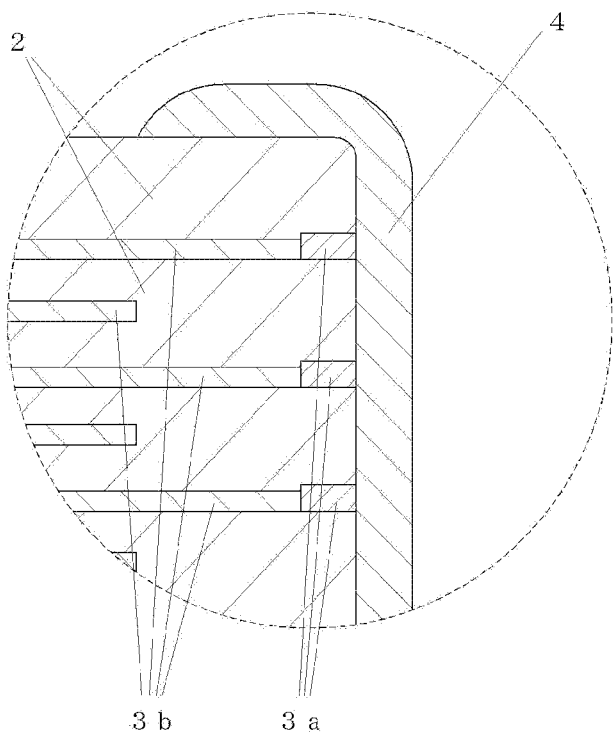
FIG. 3(a) is an enlarged cross-sectional view illustrating another example of the A portion in FIG. 1(b)
FIG. 3(b) is a cross-sectional view illustrating another example of FIG. 1(c)
Figure 3:
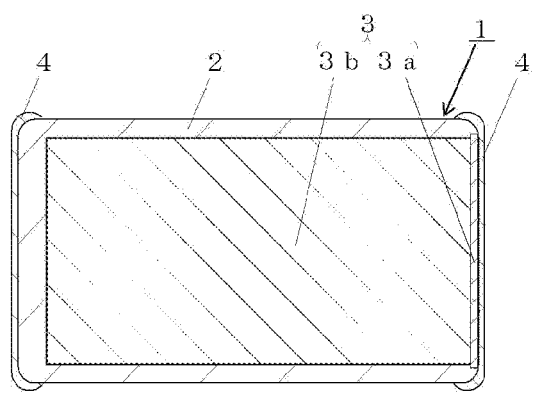
Figure 4:
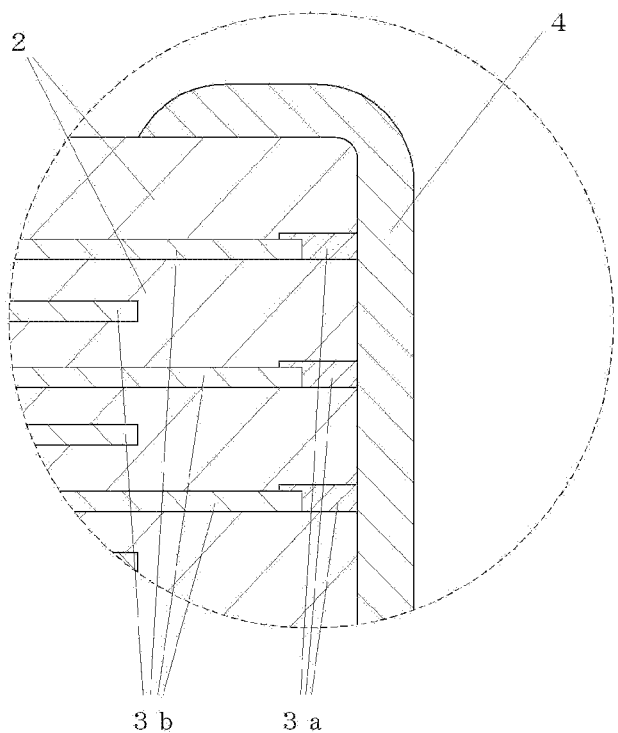
FIG. 4(a) is an enlarged cross-sectional view illustrating still another example of the A portion in FIG. 1(b)
FIG. 4(b) is a cross-sectional view illustrating still another example of FIG. 1(c)
Figure 4:
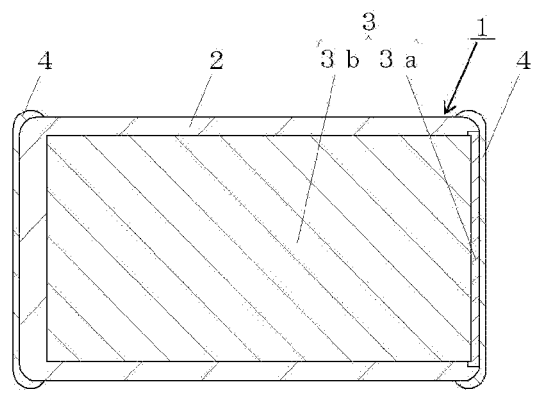
Figure 5:
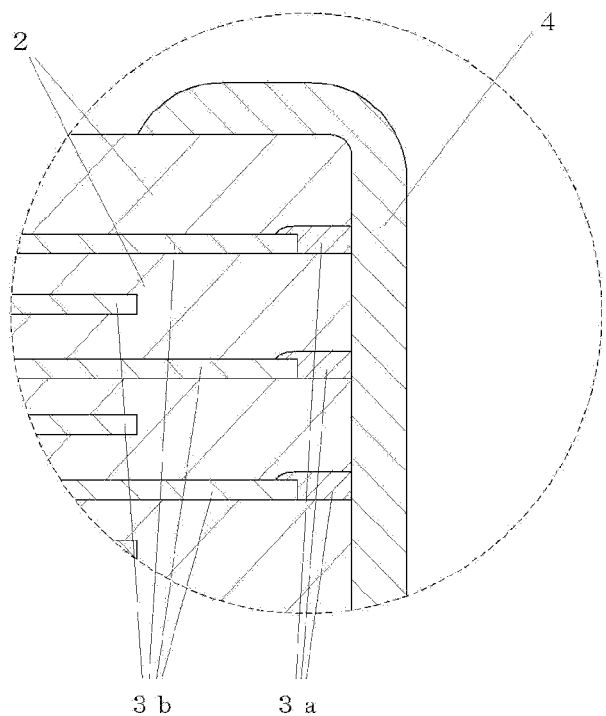
FIG. 5(a) is an enlarged cross-sectional view illustrating still another example of the A portion in FIG. 1(b)

As in examples illustrated in FIG. 3 to FIG. 5, it is preferable that the thickness of the connection electrode portion 3a is larger than that of the internal electrode portion 3b. In this case, in the connection electrode portion 3a, even when the ratio of the material having a melting point higher than that of the internal electrode portion 3b is high and thus specific resistance increases, it is possible to make an electrical resistance value small due to a large thickness. In addition, since the thickness of the connection electrode portion 3a is larger than that of the internal electrode portion 3b, even when stress is applied to the stacked body 1a and cracks occur from an end of the gap between the internal electrode layer 3 (internal electrode portion 3b) and the dielectric layer 2 inside the stacked body 1a as a starting point along an interface between the internal electrode portion 3b and the dielectric layer 2, it is possible to prevent the cracks from propagating, and thus it is possible to prevent the gap from ranging from the end surface of the stacked body 1a to the inside of the stacked body 1a.

In addition, in a case of using a green sheet lamination method for preparation of the stacked body 1a, since the thickness of the connection electrode portion 3a is larger than that of the internal electrode portion 3b, it is possible to reduce distortion of the dielectric layer 2 which is caused by a difference in the number of internal electrode layers 3 between a portion at which the internal electrode layer 3 exposed to the first end surface and the internal electrode layer 3 exposed to the second end surface face and overlap each other (facing region), and a portion on an external electrode side at which the internal electrode layers 3 exposed to the same end surface overlap each other. At this time, it is preferable that the inner end of the connection electrode portion 3a is located between the end surface of the stacked body 1a and the facing region, and be located at a position as close as possible to an edge of the facing region. For example, the thickness of the connection electrode portion 3a may be set to be larger than that of the internal electrode portion 3b by approximately 0.3 to 2 μm.

In addition, it is preferable that the inner end of the connection electrode portion 3a is located at the edge of the facing region.

To make the electrical resistance value of the connection electrode portion 3a small, as in the example illustrated in FIG. 3(b), it is preferable that in the length in the short-side direction (y direction in FIG. 1) of the stacked body 1a, the length of the connection electrode portion 3a is longer than that of the internal electrode portion 3b.

In addition, as in the examples illustrated in FIG. 4 and FIG. 5, it is preferable that the connection electrode portion 3a is disposed to overlap an end of the internal electrode portion 3b. In this case, in the stacked body 1a, a gap is less likely to be formed between the dielectric layer 2 and the internal electrode portion 3b at the end of the internal electrode portion 3b, and thus the gap between the internal electrode layer 3 and the dielectric layer 2 is reduced at the end of the internal electrode layer 3. The connection electrode portion 3a which has an intermediate behavior of sintering shrinkage behaviors of the internal electrode layer 3 (internal electrode portion 3b) and the dielectric layer 2 during the firing in the process of manufacturing the stacked body 1a, is interposed between the internal electrode layer 3 (internal electrode portion 3b) and the dielectric layer 2. Accordingly, in the stacked body 1a, a gap which occurs due to a difference in the sintering shrinkage behavior between the internal electrode layer 3 (internal electrode portion 3b) and the dielectric layer 2, is reduced.

In addition, as in the examples illustrated in FIG. 4 and FIG. 5, it is preferable that an inner end of the overlapping portion between the connection electrode portion 3a and the internal electrode portion 3b is located between the end surface of the stacked body 1a and the facing region, and is located at a position as close as possible to the edge of the facing region. In addition, it is preferable that the inner end of the overlapping portion between the connection electrode portion 3a and the internal electrode portion 3b is located at the edge of the facing region. According to this, it is possible to make electrical resistance of the connection electrode portion 3a small, and it is possible to reduce distortion of the dielectric layer 2 which is caused by a difference in the number of the internal electrode layers 3.

In addition, even in the stacked body 1a after the firing, since the connection electrode portion 3a which has an intermediate material composition of material compositions of the internal electrode layer 3 (internal electrode portion 3b) and the dielectric layer 2, is interposed between the internal electrode layer 3 (internal electrode portion 3b) and the dielectric layer 2, coupling between the internal electrode layer 3 (internal electrode portion 3b) and the dielectric layer 2 becomes strong, and a difference in a thermal expansion coefficient becomes small. As a result, a possibility of occurrence of cracks between the internal electrode layer 3 (internal electrode portion 3b) and the dielectric layer 2 is reduced in the stacked body 1a.

In addition, as in the example illustrated in FIG. 5, it is preferable that a corner of the end of the connection electrode portion 3a that overlaps the internal electrode portion 3b is rounded. In the stacked body 1a, a boundary between the dielectric layer 2 and the connection electrode portion 3a which have material compositions different from each other, does not have a corner portion to which stress is likely to be concentrated, and thus a possibility of occurrence of cracks at the boundary which starts from the corner portion is reduced.

The external electrode 4 is disposed on each predetermined end surface so as to mutually connect the internal electrode layers 3 exposed to each end surface of the stacked body 1a. For example, the thickness of the external electrode 4 is set to 5 to 50 μm. For example, the external electrode 4 is formed of metal materials such as copper, silver, nickel, palladium, or alloys of these metals, and may contain glass so as to improve adhesion with the stacked body 1a.

It is preferable that, for example, one or a plurality of plated films such as a Ni plated film and a Sn plated film are formed on a surface of the external electrode 4 for protection of the external electrode 4, improvement of mountability thereof, and the like. For example, a laminate of the Ni plated film and the Sn plate film may be formed on the surface of the external electrode 4.

Figure 6:
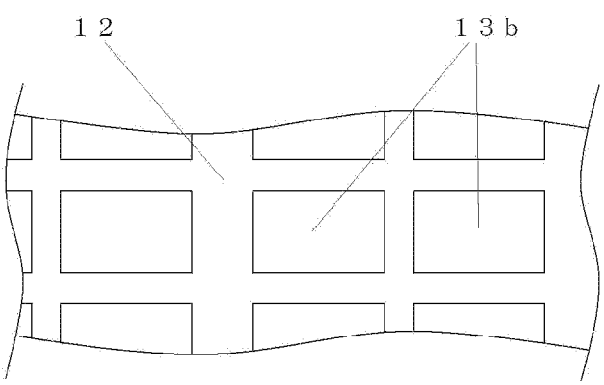
Figure 6:
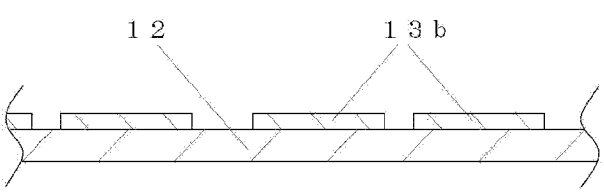

For example, the multilayer ceramic capacitor 1 having the above-described configuration can be prepared by the following manufacturing method. First, as in an example illustrated in FIG. 6, an internal conductive paste layer 13b which becomes the internal electrode portion 3b, is formed on a plurality of ceramic green sheets 12 which become the dielectric layers 2. An appropriate organic solvent and the like are added to and mixed with a raw material powder of dielectric ceramics and an organic binder to prepare a ceramic slurry in a slurry form, and then the ceramic slurry is shaped by a doctor blade method or otherwise to obtain the ceramic green sheets 12.

The internal conductive paste layer 13b which becomes the internal electrode portion 3b, is formed by printing conductive paste in a predetermined shape on the ceramic green sheets 12 by a screen printing method or otherwise. In addition, as in the example illustrated in FIG. 6, a plurality of internal conductive paste layers 13b are formed on one sheet of ceramic green sheet 12 to simultaneously obtain a plurality of multilayer ceramic capacitors 1.

The conductive paste for the internal conductive paste layer 13b is prepared by adding a binder, a solvent, a dispersant, and the like to a powder of the conductive material (metal material) and a powder of the material having a higher melting point of the internal electrode layer 3, and by kneading them.

Figure 7:
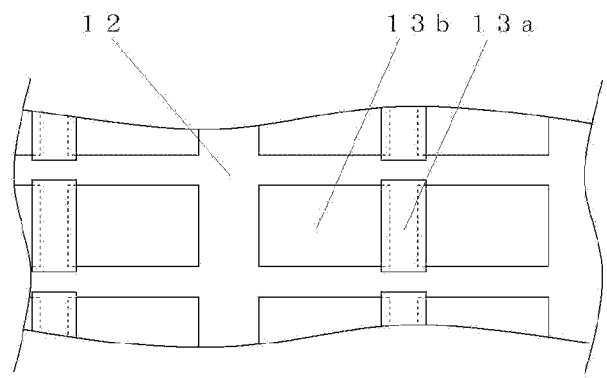
Figure 7:
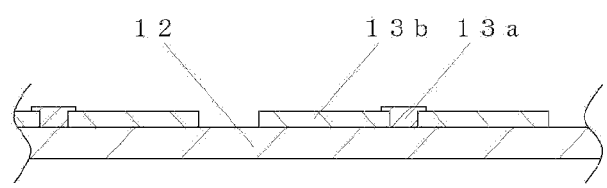

Next, a connection conductive paste layer 13a which becomes the connection electrode portion 3a, is formed to come into contact with ends of the internal conductive paste layers 13b. An example illustrated in FIG. 7 illustrates a method of manufacturing the multilayer ceramic capacitor 1 in which the connection electrode portion 3a is disposed to overlap the end of the internal electrode portion 3b as in the examples illustrated in FIG. 4 and FIG. 5. That is, the connection conductive paste layer 13a which becomes the connection electrode portion 3a, is formed to overlap the ends of the internal conductive paste layers 13b. At this time, it is possible to prepare the multilayer ceramic capacitor 1 in which a corner on an end of the connection electrode portion 3a overlapping the internal electrode portion 3b is rounded as in the example illustrated in FIG. 5, by adjusting the viscosity of the conductive paste for the connection conductive paste layer 13a. That is, it is possible to make the upper surface of the connection conductive paste layer 13a be rounded due to surface tension of the conductive paste.

The conductive paste for the connection conductive paste layer 13a is prepared in the same manner as the conductive paste for the above-described internal conductive paste layer 13b by increasing an amount of the material having a higher melting point. Adjustment of the viscosity may be made by an amount of a binder or a solvent.

Figure 8:
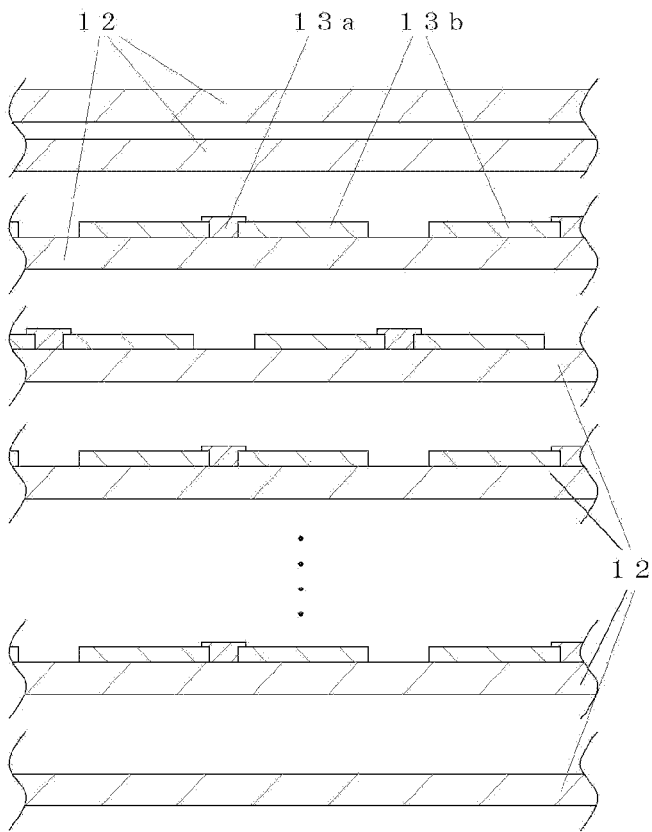
FIG. 8 is a cross-sectional view illustrating a process of manufacturing the multilayer ceramic capacitor according to the embodiment of the invention.
Figure 9:
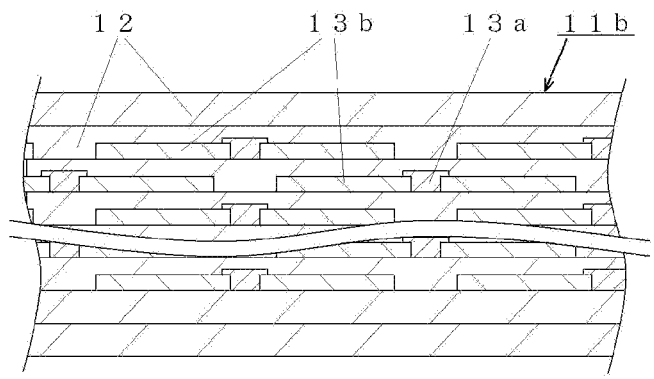
FIG. 9 is a cross-sectional view illustrating a process of manufacturing the multilayer ceramic capacitor according to the embodiment of the invention.

Next, as in an example illustrated in FIG. 8, the plurality of ceramic green sheets 12 bearing the internal conductive paste layers 13b and the connection conductive paste layers 13a, are laminated. The lamination is performed in such a manner that the connection conductive paste layers 13a are overlaid every other layer, and a ceramic green sheets 12 not bearing the internal conductive paste layers 13b and the connection conductive paste layers 13a, are laminated at the uppermost side and the lowest side. The plurality of ceramic green sheets 12 laminated are integrated by pressing to obtain a large-sized green stacked body 11b that includes a plurality of green stacked bodies 11a as in an example illustrated in FIG. 9.

Figure 10:
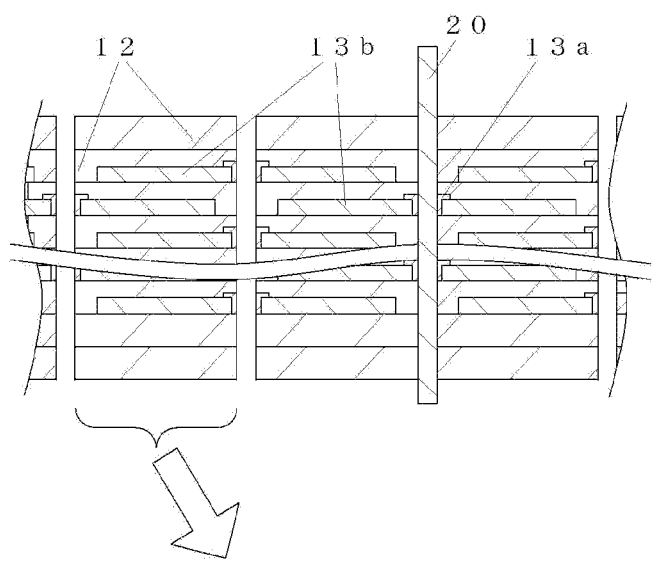
FIG. 10(a) and FIG. 10(b) are cross-sectional views illustrating a process of manufacturing the multilayer ceramic capacitor according to the embodiment of the invention.
Figure 10:
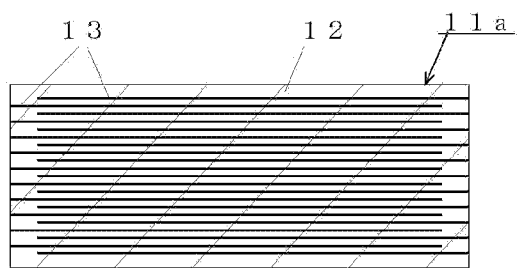

Next, as in an example illustrated in FIG. 10(a), the large-sized green stacked body 11b is cut out to obtain the green stacked body 11a that becomes the stacked body 1a of the multilayer ceramic capacitor 1 as in an example illustrated in FIG. 10(b). For example, cutting-out of the large-sized green stacked body 11b may be performed by using a dicing blade 20.

Figure 11:
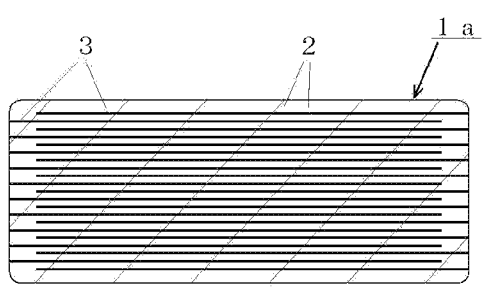
FIG. 11(a) and FIG. 11(b) are cross-sectional views illustrating a process of manufacturing the multilayer ceramic capacitor according to the embodiment of the invention.
Figure 11:
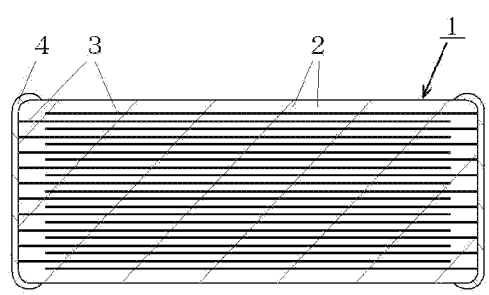

In addition, the green stacked body 11a is fired, for example, at 800 to 1050° C. to obtain the stacked body 1a. According to this process, the ceramic green sheet 12 becomes the dielectric layer 2, and the internal conductive paste layer 13b and the connection conductive paste layer 13a become the internal electrode portion 3b and the connection electrode portion 3a, respectively, thereby forming the internal electrode layer 3. A corner of the stacked body 1a may be made to be rounded as in an example illustrated in FIG. 11(a) by means of polishing such as barrel polishing. According to this, the stacked body 1a is less likely to be chipped.

Next, for example, conductive paste for the external electrode 4 which becomes the external electrode 4, is applied to both ends of the stacked body 1a, and baking is performed to form the external electrode 4. The conductive paste for the external electrode 4 is prepared by adding a binder, a solvent, a dispersant, and the like to the above-described powder of the metal material which constitutes the external electrode 4, and by kneading them.

A metal layer such as a nickel (Ni) layer, a copper (Cu) layer, a gold (Au) layer, a tin (Sn) layer, or a solder layer is formed on the surface of the external electrode 4 by a plating method as necessary, thereby obtaining the multilayer ceramic capacitor 1.

In the above-described manufacturing method, as a method of preparing the large-sized green stacked body 11b, the green sheet lamination method has been described as an example, but a printing lamination method in which printing application and drying of the ceramic slurry, and printing application and drying of the conductive paste that becomes the internal electrode layer 3 are repetitively performed, may be used.

In addition, as a method of forming the external electrode 4, a thin film forming method such as deposition, plating, and sputtering is possible instead of the method of baking the conductive paste.

REFERENCE SIGNS LIST

1: Multilayer ceramic capacitor
2: Dielectric layer
3: Internal electrode layer
3a: Connection electrode portion
3b: Internal electrode portion
4: External electrode

The invention claimed is:

1. A multilayer ceramic capacitor, comprising:
a stacked body comprising dielectric layers and internal electrode layers alternately laminated; and
an external electrode disposed on an end surface of the stacked body and connected to the internal electrode layers,
the internal electrode layers each including a connection electrode portion connected to the external electrode, and an internal electrode portion which is connected to the connection electrode portion and extends toward an inner side of the stacked body,
the connection electrode portion containing a first conductive material and a material having a melting point higher than that of the first conductive material,
the internal electrode portion containing a second conductive material, or the second conductive material and a material having a melting point higher than that of the second conductive material,
a ratio of the material having a melting point higher than that of the first conductive material with respect to a total amount of the first conductive material and the material having a melting point higher than that of the first conductive material in the connection electrode portion is higher than a ratio of the material having a melting point higher than that of the second conductive material with respect to a total amount of the second conducive material and the material having a melting point higher than that of the second conductive material in the internal electrode portion.

2. The multilayer ceramic capacitor according to claim 1, wherein the material having a melting point higher than that of the first conductive material is formed of a material same as a dielectric material of the dielectric layer.

3. The multilayer ceramic capacitor according to claim 1, wherein the material having a melting point higher than that of the second conductive material is formed of a material same as a dielectric material of the dielectric layer.

4. The multilayer ceramic capacitor according to claim 1, wherein the connection electrode portion is disposed to overlap an end of the internal electrode portion.

5. The multilayer ceramic capacitor according to claim 4, wherein an end of the connection electrode portion that overlaps the internal electrode portion is rounded.

6. The multilayer ceramic capacitor according to claim 1, wherein the connection electrode portion has a thickness larger than that of the internal electrode portion.

7. The multilayer ceramic capacitor according to claim 1, wherein the first conductive material and the second conductive material are a same metal or a same alloy.

* * * * *